(12) United States Patent
Edwards et al.

(10) Patent No.: US 8,123,274 B1
(45) Date of Patent: Feb. 28, 2012

(54) PROTECTIVE COVER FOR TRAILERABLE ITEMS

(76) Inventors: Roger H. Edwards, Coral Springs, FL (US); Drew R. Edwards, New York, NY (US)

( * ) Notice: Subject to any disclaimer, the term of this patent is extended or adjusted under 35 U.S.C. 154(b) by 0 days.

(21) Appl. No.: 13/012,431

(22) Filed: Jan. 24, 2011

(51) Int. Cl.
*B60J 7/00* (2006.01)

(52) U.S. Cl. ............... 296/100.11; 296/136.12; 114/361

(58) Field of Classification Search ............. 296/136.12, 296/136.03, 136.1, 136.11, 100.14, 100.11; 114/361
See application file for complete search history.

(56) References Cited

U.S. PATENT DOCUMENTS

| | | | |
|---|---|---|---|
| 2,598,940 A * | 6/1952 | Robie | ........................... 135/133 |
| 5,228,408 A | 7/1993 | Jannausch | |
| 5,564,358 A | 10/1996 | Newton | |
| 5,769,105 A | 6/1998 | Margol et al. | |
| 5,944,039 A | 8/1999 | Bergeron | |
| 6,006,692 A | 12/1999 | Szukhent, Jr. | |
| 6,092,856 A * | 7/2000 | Ladensack | ............... 296/100.11 |
| 7,051,669 B2 | 5/2006 | Warfel et al. | |

* cited by examiner

*Primary Examiner* — Joseph Pape
(74) *Attorney, Agent, or Firm* — McCormick, Paulding & Huber LLP

(57) ABSTRACT

A protective cover for trailerable items includes a support frame having a plurality of ribs having opposed first and second leg members and a lateral batten member spanning the first and second leg members and defining an open area thereunder, and a flexible cover supported on the support frame, wherein each of the first leg members are rotatable about a first axis and each of the second leg members are rotatable about a second axis. The plurality of ribs are selectively movable between a first position in which they are spaced apart and the flexible cover encompasses an entirety of a trailerable item, and a second position in which the plurality of ribs are adjacent one another and extend substantially vertically to allow for loading and unloading of the trailerable item from a trailer while the protective cover is attached to the trailer.

15 Claims, 10 Drawing Sheets

PROTECTIVE COVER FOR TRAILERABLE ITEMS

FIELD OF THE INVENTION

The present invention relates generally to protective covers and, more particularly, to a protective cover for trailerable items such as boats, personal watercraft, motorcycles, snowmobiles and the like.

BACKGROUND OF THE INVENTION

The covering of trailerable items such as boats and personal watercraft is a tedious process and usually requires more than one person, but is essential for the protection of a boat's interior and instrumentation from the elements. As will be readily appreciated, traditional boat covers are often difficult to install and require packing and storing when not in use. Further, such traditional covers require a user to remember to separately transport the tarp, as it does not travel as part of the boat/trailer system. Indeed, fully enclosed canvas boat covers are cumbersome to remove and reinstall, and it is not uncommon to take 20 to 30 minutes for each task.

In addition, certain types of known outdoor boat covers often do not cover the entire boat or other trailerable item, leaving some portions of the boat, such as the motor, exposed to the elements. Moreover, known boat covers have a tendency to have flat areas or low spots, depending on the contours of the boat, that are susceptible to water, ice, snow and/or debris accumulation. Such accumulation is undesirable as it can damage or tear a hole in the cover, leading to damage of the interior and instrumentation of the boat.

Alternatively, such trailerable items may also be stored in indoor facilities, however, the cost of such storage each month is often exorbitantly high.

In view of the problems associated with known protective covers for trailerable items, there is a need for an improved protective cover for trailerable items, such as boats, that can be transported with the trailer and can quickly and easily be deployed and retracted.

SUMMARY OF THE INVENTION

In view of the foregoing, it is an object of the present invention to provide a protective cover for trailerable items such as boats, personal watercraft, snowmobiles, motorcycles and the like.

It is another object of the present invention to provide a protective cover for trailerable items that covers an entirety of the trailerable item.

It is another object of the present invention to provide a protective cover for trailerable items that is selectively attachable to the trailer such that it travels with the trailer.

It is another object of the present invention to provide a protective cover for trailerable items that minimizes the accumulation of water, ice, snow and other debris.

It is another object of the present invention to provide a protective cover for trailerable items that is easily executable and can be adapted to fit most boat trailers.

It is another object of the present invention to provide a protective cover for trailerable items that is easily operable by a single person.

It is another object of the present invention to provide a protective cover for trailerable items that is movable from a fully covered position to an uncovered position in a short period of time.

According to one aspect of the preferred embodiment of the present invention, there is provided a protective cover for trailerable items having a support frame including a plurality of ribs having opposed first and second leg members and a lateral batten member spanning the first and second leg members and defining an open area thereunder, and a flexible cover supported on the support frame, wherein each of the first leg members are rotatable about a first axis and each of the second leg members are rotatable about a second axis. Each of the support ribs are operatively connected to a trailer at approximately a midpoint along a length of the trailer frame.

The plurality of ribs are selectively movable between a first position in which they are spaced apart and the flexible cover encompasses an entirety of a trailerable item, and a second position in which the plurality of ribs are adjacent one another and extend substantially vertically to allow for loading and unloading of the trailerable item from the trailer while the protective cover is attached to the trailer.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
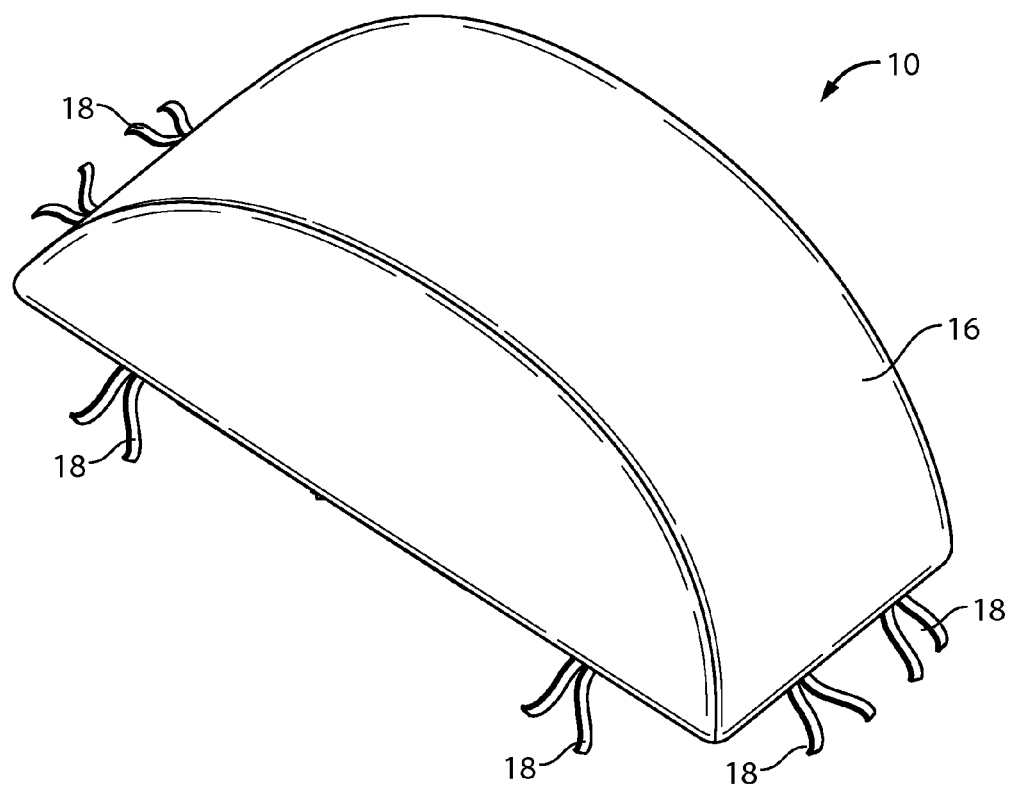
FIG. 1 is a perspective view of a protective cover for trailerable items in accordance with one embodiment of the present invention.
Figure 2:
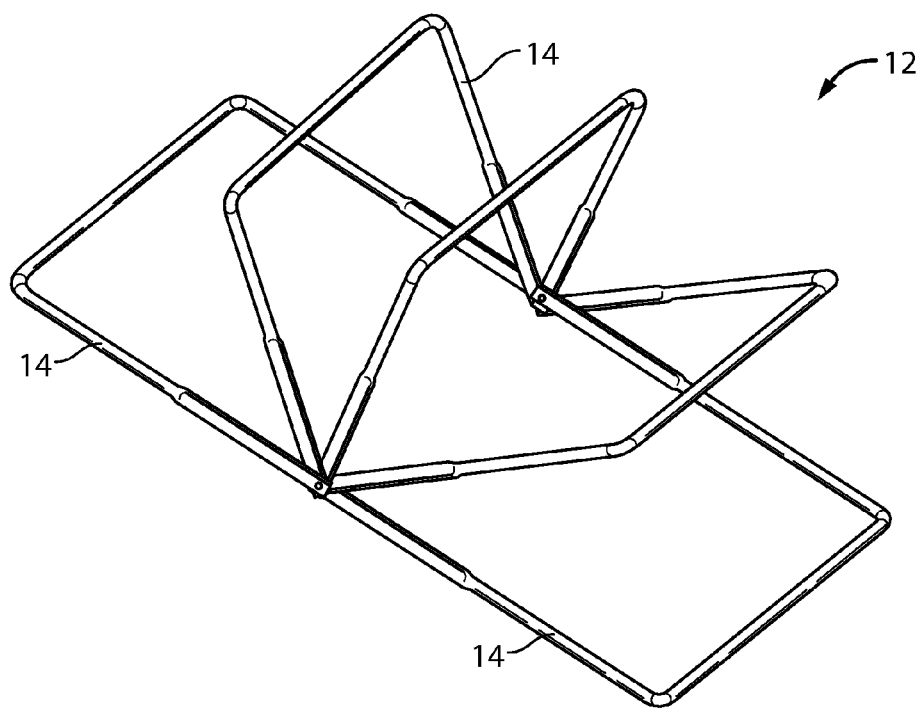
FIG. 2 is a perspective view of the support frame of the protective cover for trailerable items of FIG. 1 in accordance with one embodiment of the present invention.
Figure 3:
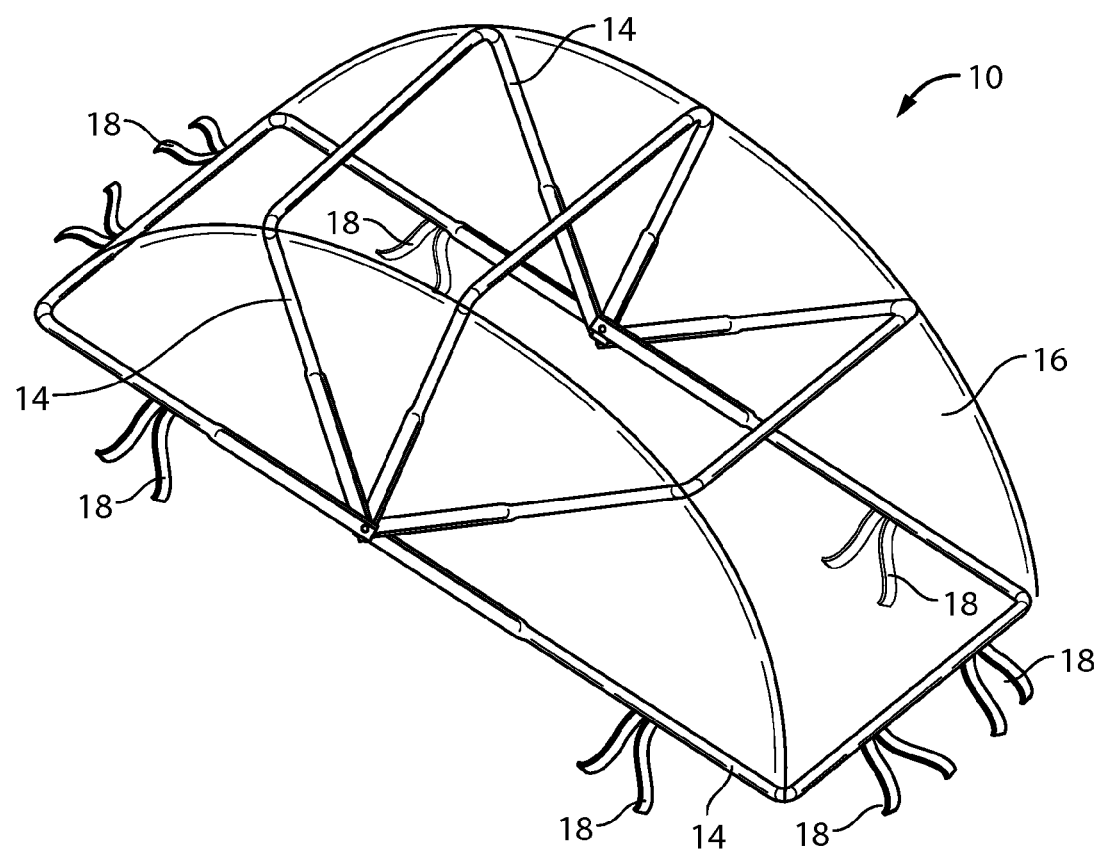
FIG. 3 is a perspective view of the protective cover and support frame, the cover being shown in transparent, in accordance with one embodiment of the present invention.

Referring generally to FIGS. 1-3, a protective cover 10 for trailerable items according to one embodiment of the present invention is shown. As used herein, "trailerable" is defined as being adapted for and capable of transportation by a trailer. Moreover, as used herein, "trailerable item" is defined as any item that is customarily or capable of being supported and transported by a trailer, such as boats, snowmobiles, motorcycles and the like. As shown therein, the protective cover 10 includes a flexible cover 16 and a support frame 12 having a plurality of ribs 14 for supporting the flexible cover 16. In the preferred embodiment, the support frame has 5 support ribs 14, although more or fewer ribs can be used depending on the length of the trailerable item to be covered. The flexible cover 16 is preferably sewn in loops around the ribs 14, however, other means of attachment known in the art may also be used. The flexible cover 16 may be a tarpaulin and can be formed from fabric canvas, vinyl or other conventional protective material, the primary function being to isolate the trailerable item and its interior from debris and inclement weather. In any event, the cover 16 is substantially waterproof such that water is not permitted to pass through. As best shown in FIGS. 1 and 3, in its fully covered position, the protective cover 10 has a half-wheel type shape. In this position, the flexible cover 16 is pulled taught between the ribs 14, which aids in preventing the accumulation of water, ice, snow and other debris.

As best shown in FIG. 1, the flexible cover 16 has a plurality of straps 18 to secure the cover 16 to a frame of a trailer. Preferably, there are two straps on each side of the cover 16, two straps on the rear of the cover and one strap on the front of the cover 16 for securing the cover 16 to each side, rear and the front of a trailer, as discussed in detail below. The straps are preferably Velcro straps to permit a secure yet quick attachment/detachment from the I-beams of a trailer, however, other strap types or means of attachment known in the art, such as cinch straps and the like, may also be used.

Figure 4:
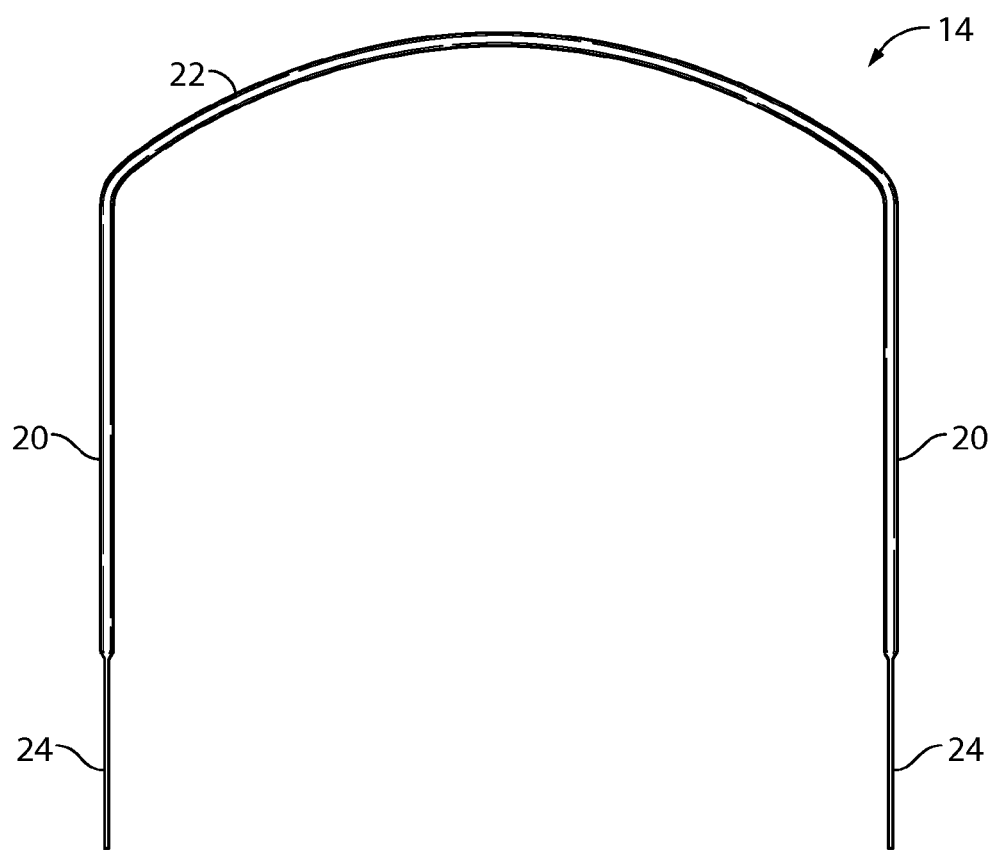
FIG. 4 is a front elevational view of an exemplary one of the ribs that comprise the support frame of the protective cover in accordance with one embodiment of the present invention.
Figure 5:
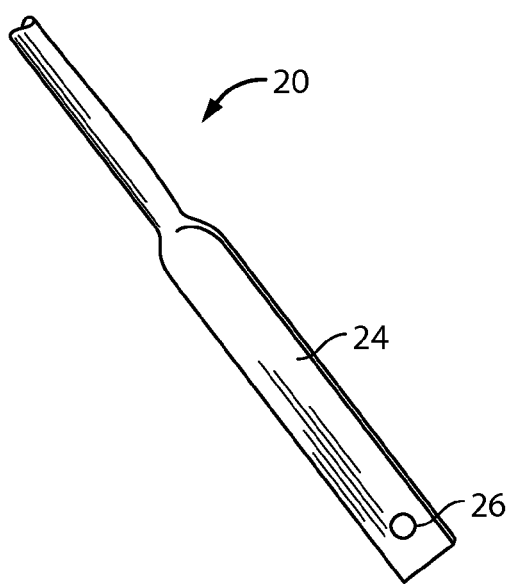
FIG. 5 is a side view of a lower portion of the rib of FIG. 4 showing a flattened, planar portion thereof in accordance with one embodiment of the present invention.
Figure 6:
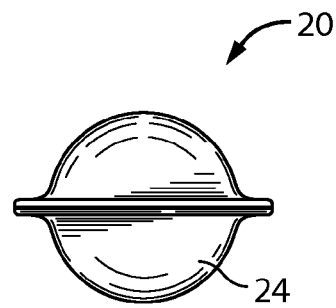
FIG. 6 is a bottom plan view of one of the ribs of FIG. 4 showing the flattened, planar portion thereof.

Turning now to FIGS. 4-6, the configuration of the support ribs 14 is shown. As shown therein, each support rib 14 has a pair of generally parallel leg members 20 and a lateral batten member 22 spanning the leg members 20 and defining an open area thereunder. The leg members 20 and batten member 22 may have any shape cross-section, such as rectangular, U, or C shape, however, it is preferred that cylindrical leg members 20 and batten members 22 having a generally rectangular cross-section be used. In the preferred embodiment, the leg members 20 and batten member 22 are formed from 1" diameter aluminum tubing, although other materials and stock diameters known in the art may also be used depending on the size of the trailerable item to be covered. The lateral batten member 22 may be arcuate in shape, however, in the preferred embodiment the batten member 22 is substantially straight.

As best shown in FIGS. 5 and 6, the distal ends of the leg members 20 have flattened portions 24. Preferably, the leg members 20 are flattened for the last 12 inches thereof and have a ribbed or rough surface texture imprinted or otherwise formed on both sides to aid in selectively locking the ribs 14 in various functional positions, as discussed in detail below. When formed from 1" diameter hollow aluminum stock, the flattened portions 24 of the leg members 20 are approximately 1.57" wide at their widest point. A generally circular aperture 26 is formed through the flattened portions 24 of each leg member 20 to permit selective mounting of the support frame 12 to a trailer in a compact manner, as discussed in detail below. In particular, the aperture 26 is sized to fit a corresponding fastening rod, hereinafter disclosed, and is preferably 3/4" inches in diameter and located at the midpoint of the flattened portion 24, approximately 6" from the end of the leg members 20.

Figure 11:
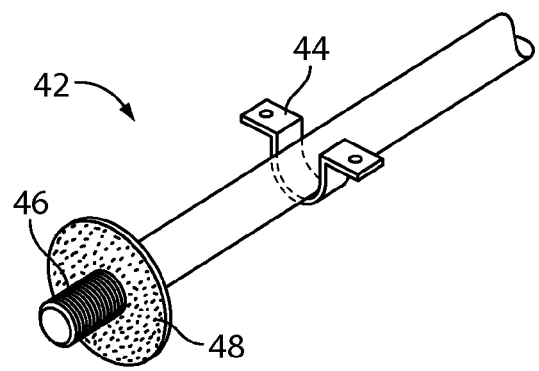
FIG. 11 is a perspective view of a fastening rod that forms a portion of the mounting mechanism of FIG. 10 in accordance with one embodiment of the present invention.
Figure 12:
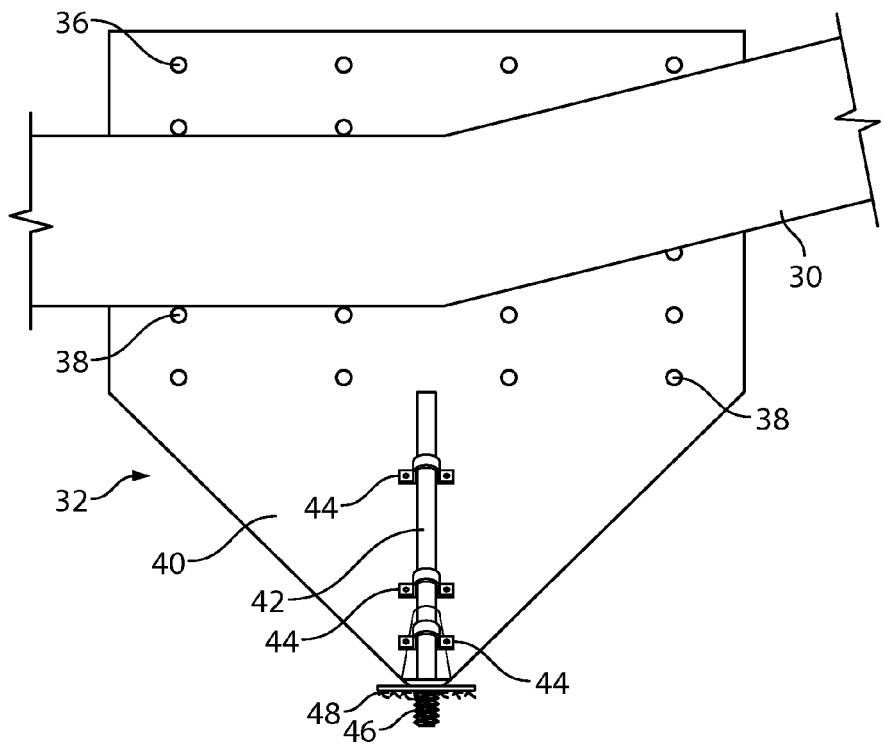
FIG. 12 is a detailed bottom plan view of a top mounting plate and fastening rod of FIG. 11 that forms a portion of the mounting mechanism of FIG. 10, shown mounted in position on a trailer I-beam.
Figure 13:
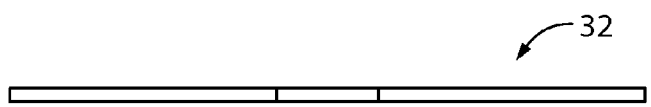
FIG. 13 is an enlarged front view of the top mounting plate of FIG. 12.
Figure 14:
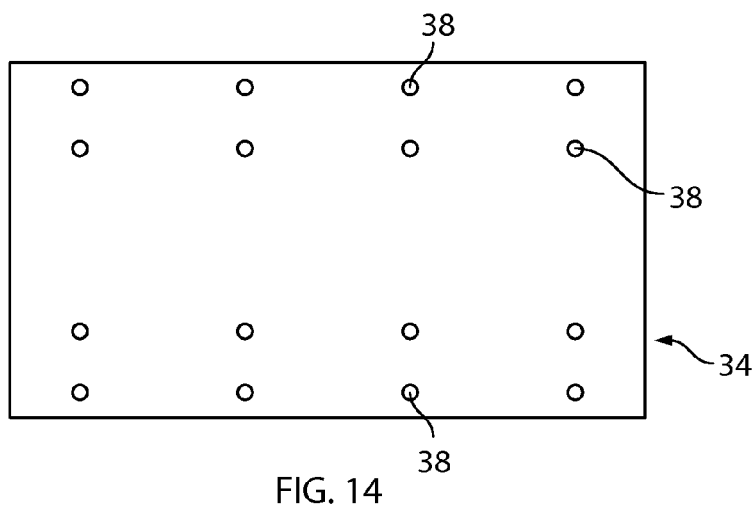
FIG. 14 is a top plan view of the bottom mounting plate that forms a portion of the mounting mechanism of FIG. 10.

As illustrated in FIGS. 10-17, a mounting mechanism 28 forms a part of the broader protective cover assembly of the present invention and is used to secure the protective cover 10 to the I-beams 30 of a wishbone-style, or other style, trailer frame. As shown therein, the mounting mechanism 28 includes two mounting plates, a top mounting plate 32 and a bottom mounting plate 34, that are clamped to the midpoint of the trailer frame on each side of the trailer using bolts 36. (See FIG. 17). In the preferred embodiment, bolts 36 are carriage or hex head bolts, although any type of bolts known in the art, such as U-bolts and the like, may also be used. The bottom mounting plate 34, as best shown in FIG. 14, is preferably 6 inches by 12 inches and has a plurality of apertures 38 formed therethrough for accommodating bolts 36. The top mounting plate 32, as best shown in FIG. 12, is generally rectangular in shape and has generally the same dimensions as the bottom mounting plate 34, including corresponding apertures 38 for the bolts 36. In addition, however, the top mounting plate 32 has a triangular extension portion 40 integrally formed therewith that extends outwards from each side of the trailer.

As best shown in FIGS. 11 and 12, a fastening rod 42 is secured to the underside of each top mounting plate 32 by U-clamps 44 (preferable three) and extends substantially perpendicular from the respective sides of the trailer. As alluded to above, the fastening rod 42 is preferably a metal rod of approximately 3/4" diameter and is sized to fit through apertures 26 in the flattened portions 24 of the leg members 20. As further shown therein, each fastening rod 42 has a threaded end portion 46 and includes an inner limiting washer 48 that is fixed in place adjacent the threaded end portion 46 to limit inward movement of the leg members 20, as discussed below. The washer 48 is approximately 2" in diameter, is positioned approximately 2" from the distal end of the fastening rod 42, and is preferably ribbed or has a rough surface texture on at least one side thereof to more securely engage the leg members 20, in particular the rough texture of the flattened portions 24 thereof, as hereinafter discussed. Importantly, the U-clamps 44 allow the fastening rod 42 to be slid back and forth to accommodate trailerable items of different widths. In addition, the adjustability of the fastening rod 42 and the triangular extension portion 40 of the top mounting plate 32 ensure that the location of the ribs 14 at the mounting points extends beyond the wheel well of the trailer.

As will be readily appreciated, the mounting mechanism 28 allows for an almost universal attachment to any point along the trailer frame and to almost any shape trailer beam. In particular, the mounting plates 32,34 can be mounted to the trailer frame even in situations where the midpoint does not fall where the trailer frame on both sides are parallel to each other (i.e., where the trailer frame begins to taper inward toward the front of the trailer and winch stand). In situations such as this, the bolts 36 can be secured at offsetting positions within each mounting plate 32,34 to accommodate a range of mounting points.

Figure 15:
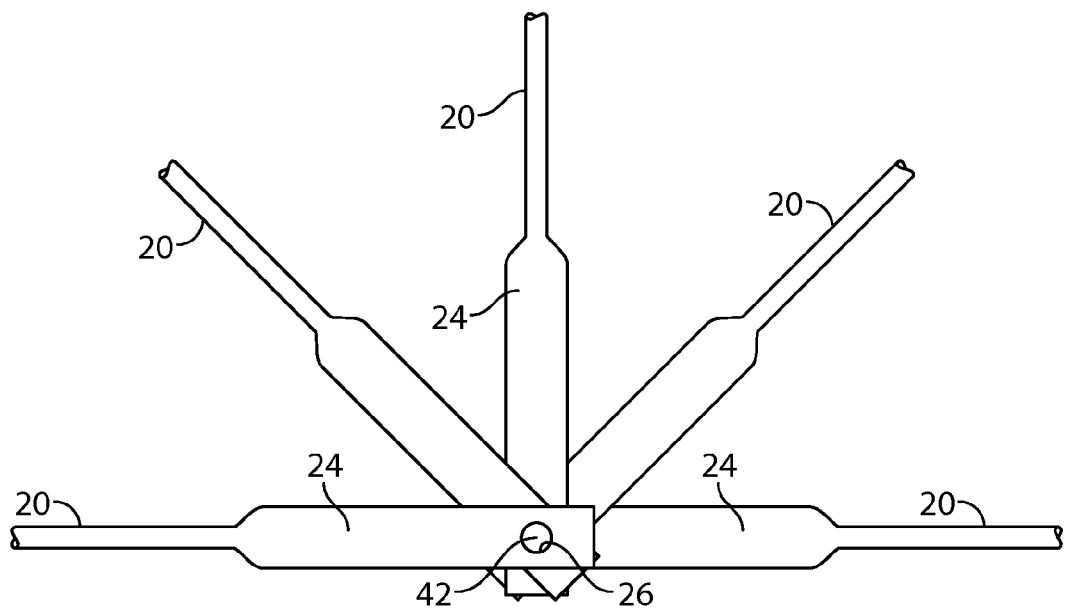
FIG. 15 is a enlarged detail view of area A of FIG. 7 showing the ribs mounted on the fastening rod of the mounting mechanism in accordance with one embodiment of the present invention.

Turning now to FIG. 15, the mounting of the ribs 14 on the fastening rod 42 is shown. During assembly, each of the ribs 14 is brought into position by sliding each leg member 20 onto the threaded end portion 46 of the fastening rod 42 via the aperture 26 in the flattened portion 24 of each leg member 20. In particular, the opposing leg members 20 on each side of the U-shaped support ribs 14 are mounted on the opposing fastening rods 42 on each side of the trailer such that the leg members 20 on each respective side of the trailer converge upon a common point. As will be readily appreciated, such a configuration allows the leg members 20 on each respective side of the trailer to rotate about a common axis.

Figure 16:
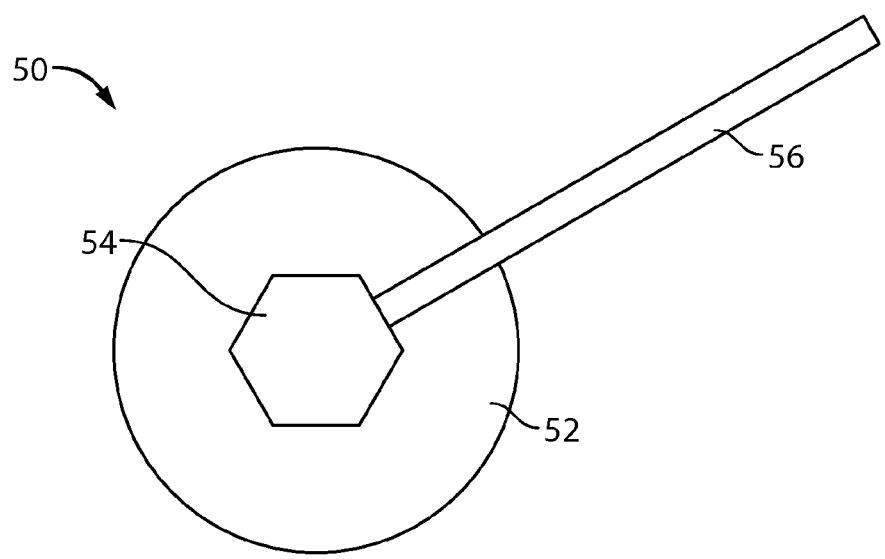
FIG. 16 is a side elevational view of a dogging mechanism in accordance with one embodiment of the present invention.
Figure 17:
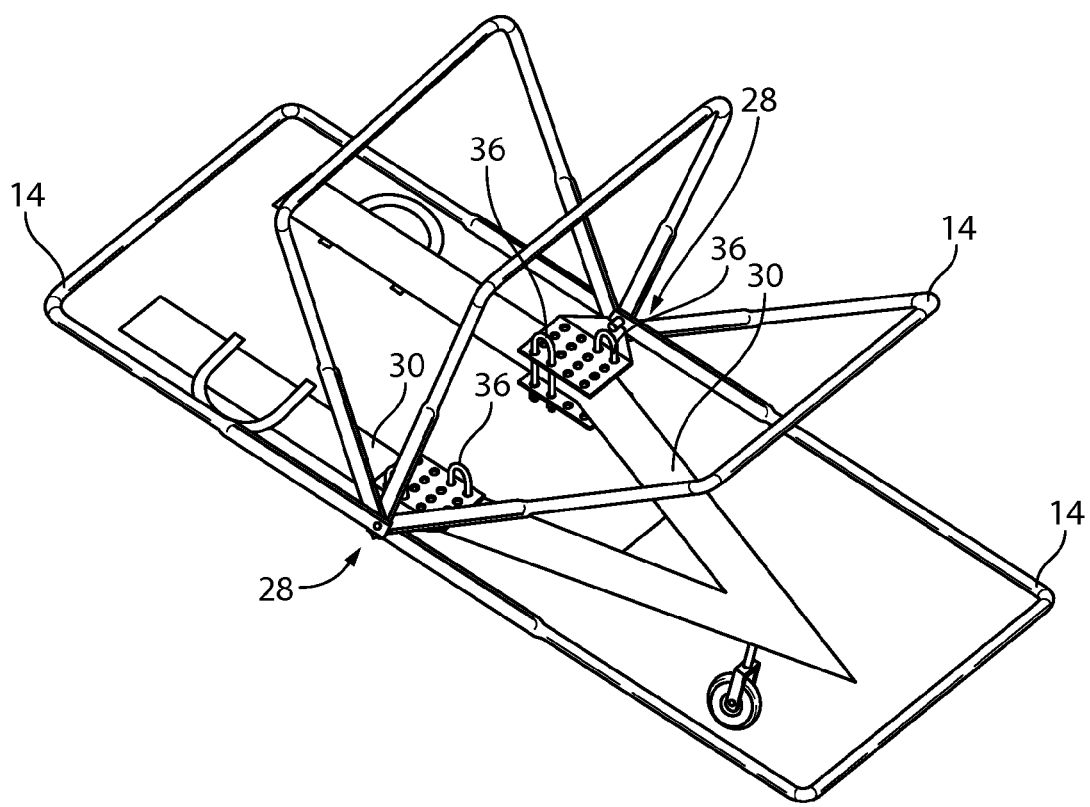
FIG. 17 is a perspective view showing the mounting mechanism of FIG. 10 positioned on the I-beams of a trailer.

A dogging mechanism 50 is threaded onto the threaded end portion 46 of the fastening rod 42 to retain the leg members 20 in place on each side of the trailer between the washers 48 and the dogging mechanisms 50. As best shown in FIG. 16, the dogging mechanism includes an outer limiting washer 52, a nut 54 and a handle 56 fixedly attached to the nut 54. In the preferred embodiment, the nut 54 is a ¾" inch nut and the handle 56 is approximately 6" long to allow a user to ergonomically operate the dogging mechanism 50 by exerting a clockwise force, and thus rotation, upon the handle 56. In addition, an automatic drill or the like having a ¾" socket can be used to engage the nut and automatically tighten and loosen the dogging mechanism 50. The dogging mechanism 50 is internally threaded (not shown) so as mate with the threaded end portion 46 of the fastening rod 42. Preferably, the outer limiting washer 52 is approximately 2" in diameter and is ribbed or has an otherwise rough surface texture on an inner portion thereof to provide a better engagement with the flattened portions 24 of the leg members 20, which also are ribbed or have a rough surface texture.

As will be readily appreciated, the ribbed surface of the washer 52 is capable of binding against the ribbed surface of the flattened portions 24 of the leg members 20 when the dogging mechanism 50 is tightened, thereby selectively holding the ribs 14 in place. Indeed, in the preferred embodiment, the flattened portions 24 of the leg members 20 are sandwiched on each side of the trailer between the inner limiting washer 48 on the fastening rod and the outer limiting washer 52 of the dogging mechanism 50. Preferably, a small hole, approximately ½" in diameter, is provided through the distal end of the threaded end section 46 of the fastening rod 42, through which a cotter pin or the like (not shown) can be inserted to retain the dogging mechanism 50 in place.

In the preferred embodiment, each mounting mechanism 28 on opposing sides of the trailer is configured with a dogging mechanism 50. Alternatively, however, only one side of the trailer may have a dogging mechanism 50. In this embodiment, the side without the dogging mechanism would be configured with a simple nut-like connection to loosely hold the leg members 20 in place on the fastening rod 42. As will be readily appreciated, in this configuration the single dogging mechanism 50 will function to rigidly hold the support frame 12, and ribs 14, in place between the single inner limiting washer 48 and outer limiting washer 52.

Figure 7:
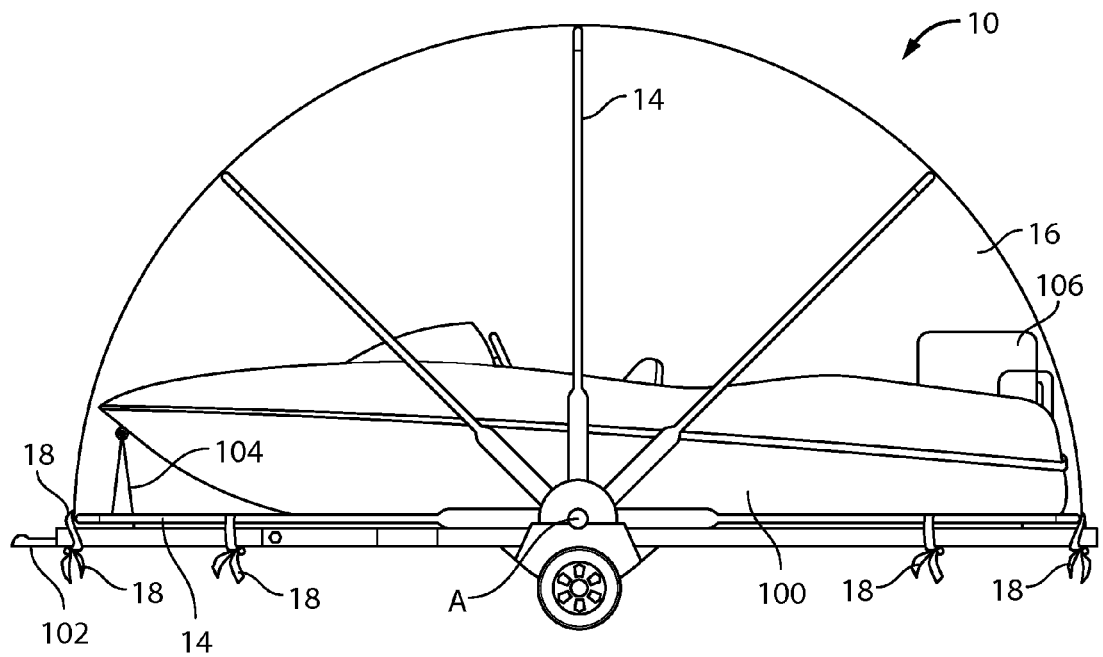
FIG. 7 is a perspective view of the protective cover for trailerable items of FIG. 1 shown in a covered position in association with a boat and trailer, the cover being shown in transparent, in accordance with one embodiment of the present invention.
Figure 8:
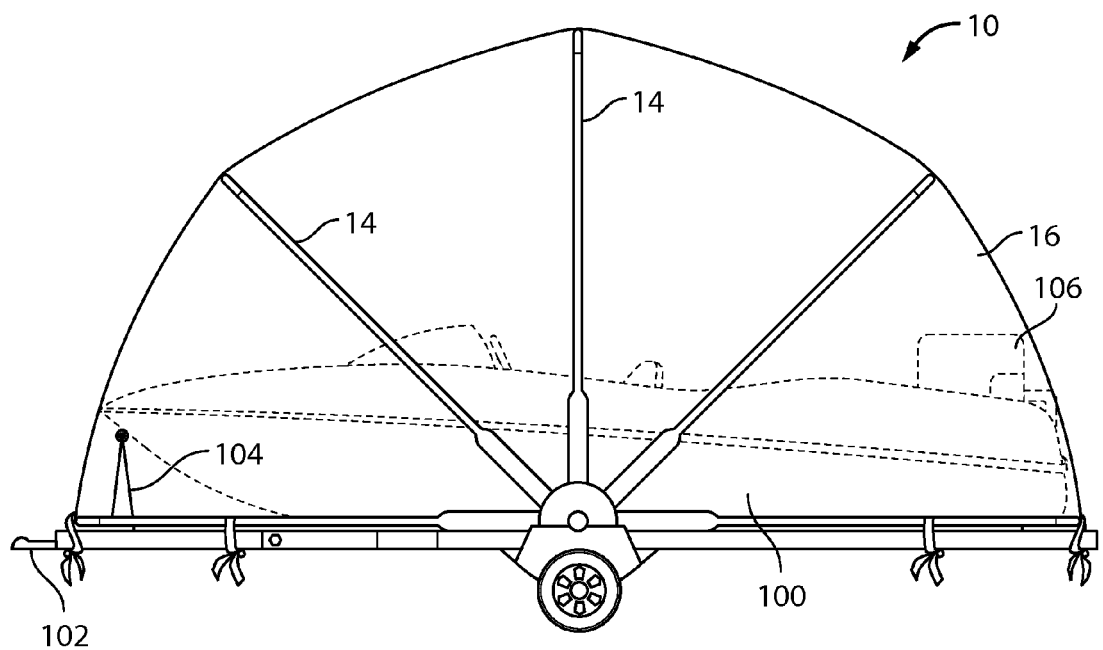
FIG. 8 is a side elevational view of the protective cover for trailerable items of FIG. 1 shown in a covered position in association with a boat and trailer, the cover being shown in transparent, in accordance with one embodiment of the present invention.
Figure 9:
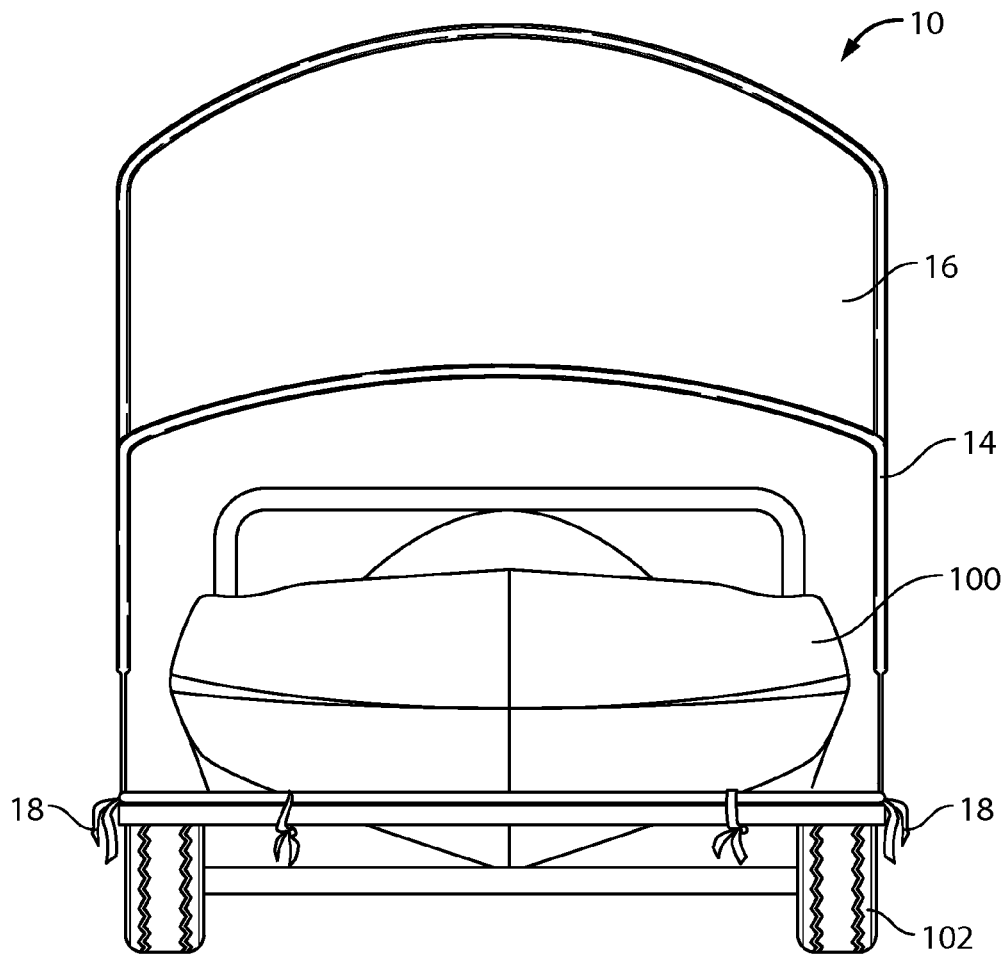
FIG. 9 is a front elevational view of the protective cover for trailerable items of FIG. 1 shown in a covered position in association with a boat and trailer, the cover being shown in transparent, in accordance with one embodiment of the present invention.
Figure 10:
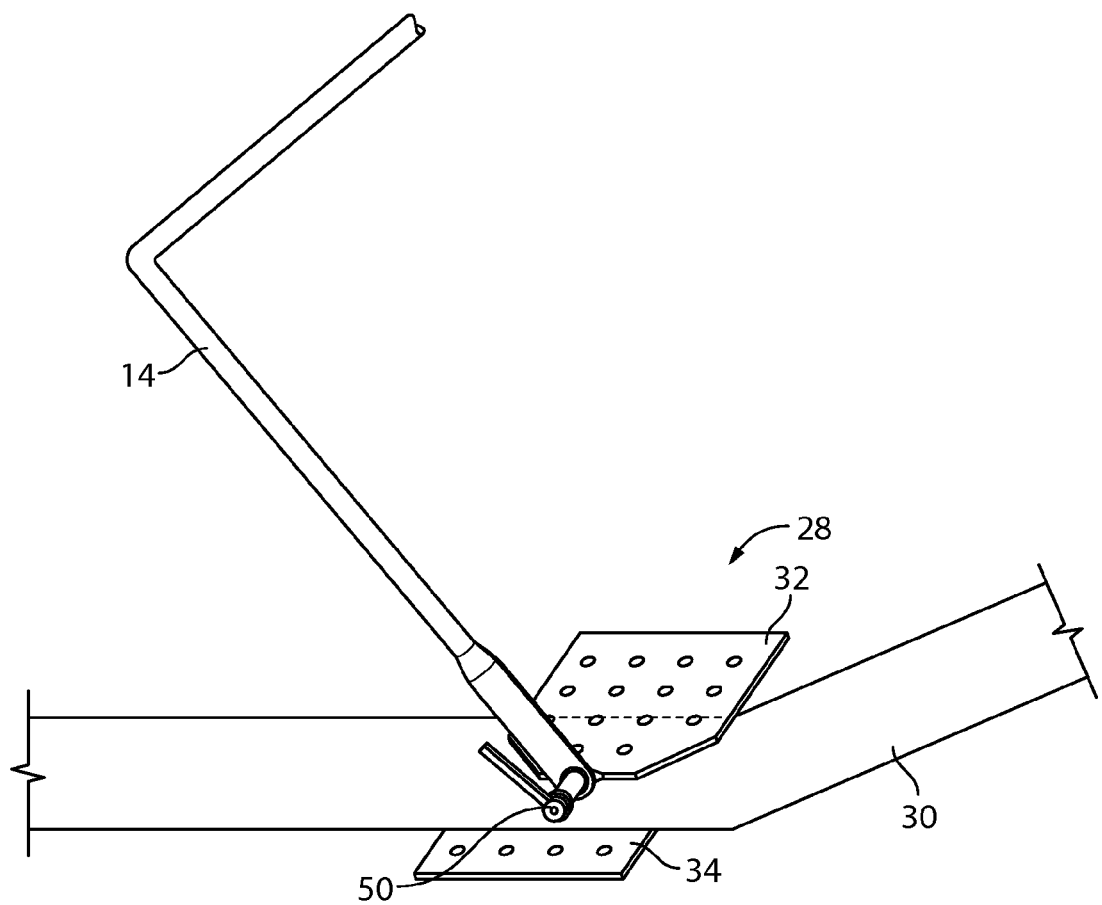
FIG. 10 is a perspective view of a mounting mechanism of the protective cover for trailerable items in accordance with one embodiment of the present invention.

Referring back to FIGS. 7-9, the protective cover 10 is shown in a fully covered position. As shown therein, the ribs 14 are mounted about fastening rods 42 on each side of the trailer and are secured in a fanned out position by way of the dogging mechanism 50 being in an engaged/tightened position with the flattened portions 24 of the leg members 20. In this fanned out position the ribs 14 define an open space thereunder in which a trailerable item, in this case a boat 100 having an outboard motor 106, is positioned. Importantly, as best shown in FIG. 9, the protective cover 10 is wider than the width of the boat 100 and extends from just in front of the winch assembly 104 on the trailer 102 to just past the outboard motor 106, as best shown in FIGS. 7 and 8. As noted above, the flexible cover 16 is secured to the sides of the trailer 102, to the rear of the trailer 102 and to a point on the trailer 102 just forward of the winch assembly 104 by straps 18.

To determine the optimal size of the protective cover 10 for use in connection with a specific boat, motorcycle, snowmobile or the like, a user may first measure the overall length of the trailerable item, such as boat 100, to be covered, from the winch assembly 104 on the trailer 102 to the furthest aft part of the motor 106 (in the trim down position). Each leg member 20 will preferably be approximately equal to one half of that distance. For example, for a 20' boat, leg members 20 should be at least 10' in length. In addition, the optimal width of the protective cover 10, and thus the length of lateral batten member 22 is 2 inches wider than the width of the trailerable item, fore example boat 100, at its widest point. Once the proper size for the ribs 14 has been determined the midpoint on the trailer 102 can be found. This midpoint is the mounting point for the mounting mechanism 28 and fastening rod 42, and is also the point upon which the leg members 20 converge and are rotatably mounted on.

Figure 18:
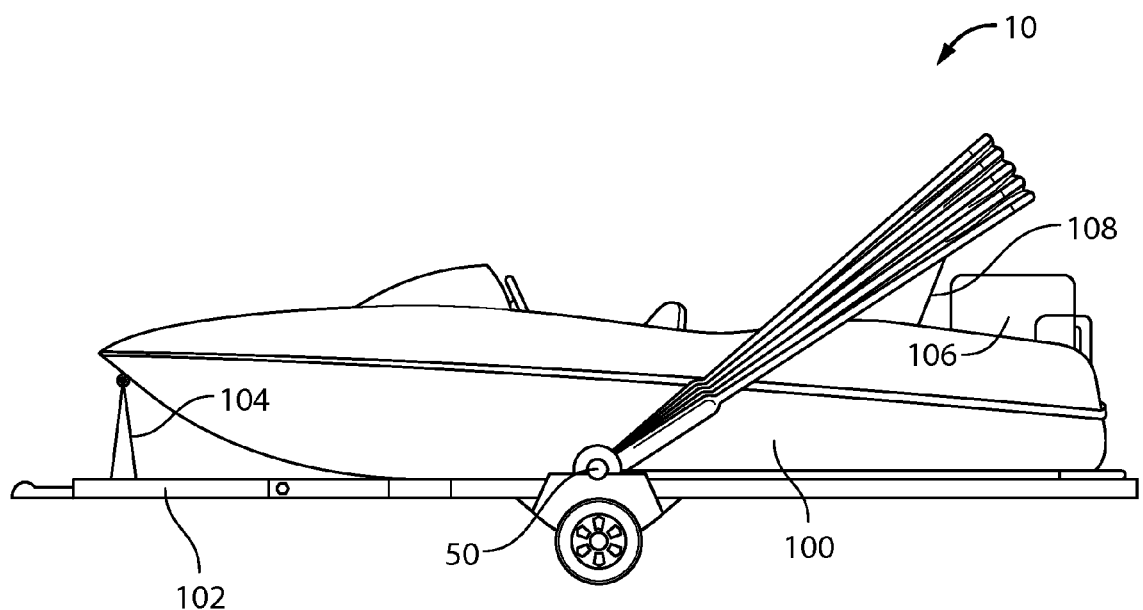
FIG. 18 is a side elevational view of the protective cover for trailerable items of FIG. 1 shown in an uncovered, transport position in association with a boat and trailer in accordance with one embodiment of the present invention.
Figure 19:
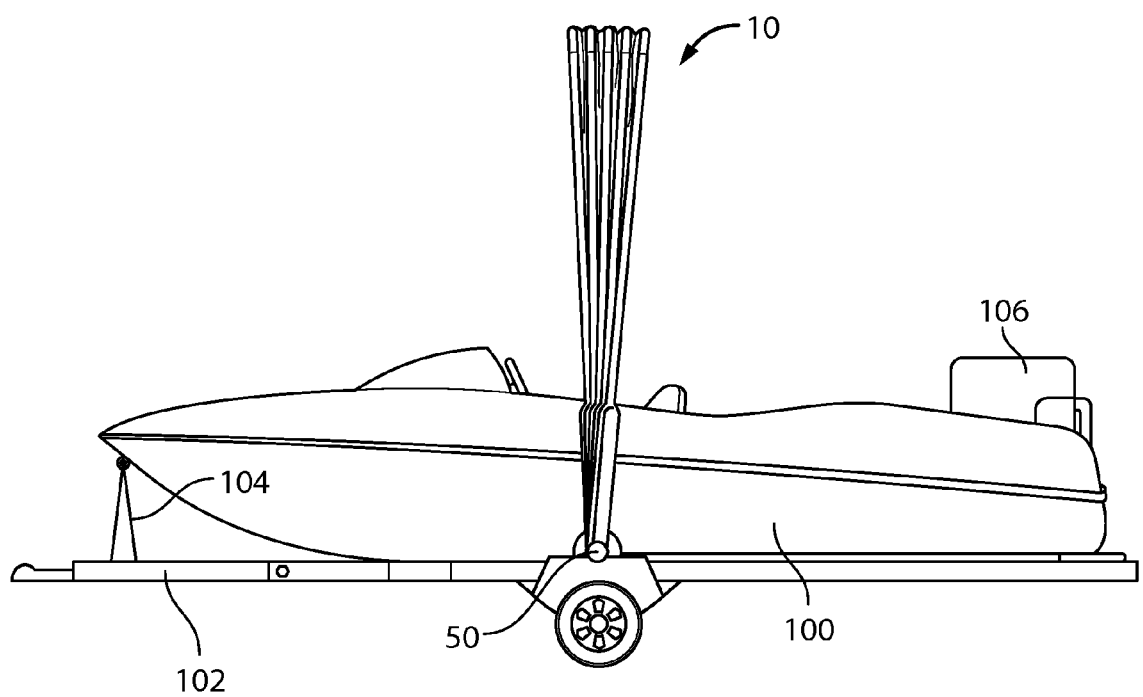
FIG. 19 is a side elevational view of the protective cover for trailerable items of FIG. 1 shown in an uncovered, launch position in association with a boat and trailer in accordance with one embodiment of the present invention.

Turning now to FIGS. 18 and 19, the protective cover 10 of the present invention is shown in trailering (FIG. 18) and launching (FIG. 19) positions, respectively. In the trailering position, with the dogging mechanism(s) 50 in its loosened/not engaged position, the ribs 14 may be brought together and laid down towards the back of the trailer 102 at ¾ position. As the ribs 14 are brought together, the flexible cover 16 bunches up in an accordion-like manner. Once in this ¾ position, the dogging mechanism 50 may once again be engaged/tightened to secure the ribs 14 in place. In addition, optional support poles 108 on each side of the boat 100 can be used to provide further support for the folded frame 12. In this embodiment, the support poles 108 may rest in gunnel-mounted fishing rod holders on each side of the boat 100. As will be readily appreciated, the ability to selectively secure the protective cover 10 in the trailering position shown in FIG. 18 allows the cover to be transported with the trailer. In particular, it allows the protective cover 10 to be transported with the trailer 102 without removing it or otherwise disconnecting it from the trailer 102 such that the cover 10 is always available on demand.

As shown in FIG. 19, the protective cover 10 may also be selectively moved into a launching position, i.e., a position in which the trailerable item may be taken off the trailer 102 or loaded onto the trailer 102. As shown therein, to configure the protective cover 10 in the launching position, the dogging mechanism(s) 50 is loosened so that the ribs can be pivoted freely about the fastening rod 42. The ribs 14 are then brought together in the same way as in the trailering position, however, the ribs are oriented substantially vertically, as shown. Once in this position, the dogging mechanism(s) 50 may once again be engaged/tightened to secure the ribs 14, and protective cover 10, in place. In an alternative embodiment, a pin or a plurality of pins (not shown) may be used to secure the ribs 14 in a desired position.

In an alternative embodiment, the ribs 14 may be offset to allow for more compact folding in the launching and trailering positions. In any event, however, straps 18 may be used in the trailering and launching positions to secure the ribs 14 together. In addition, in the trailering position shown in FIG. 19, the protective cover 10 may be zipped into a traveling, tonneau style cover.

As will be readily appreciated, the launching position provides the needed clearance to load or unload a trailerable item, such as a boat 100, from the trailer 102. Accordingly, this configuration allows a user to launch or load a trailerable item without removing the protective cover from the trailer 102. Indeed, once a boat 100 or other trailerable item is again loaded onto the trailer 102, the cover 10 may be placed in the trailering position and towed to a storage area, at which point the cover 10 can be opened into its full fanned out position to provide protection from the elements. As will be readily appreciated, each of these positions can be reached by selectively actuating (i.e., loosening and tightening) the dogging mechanism 50.

In connection with the above, the protective cover 10 of the present invention is easily executable and adaptable to any boat trailer or the like and is easily operable by a single person. By bringing the folded canvas and pole system to an upright position, the invention permits easy launching and retrieval of a boat or other trailerable item. Due to the configuration of the protective cover 10 of the present invention, and in particular the configuration of the support frame 12, mounting mechanism 28 and dogging mechanism 50, the cover 10 features a very short cycle time. The cover 10 can go from a fully covered position to an uncovered position (such as the launching position shown in FIG. 18 or the trailering position shown in FIG. 19) in approximately one or two minutes, while existing fully enclosed canvas boat covers are cumbersome to remove and reinstall, often taking 20-30 minutes for each task.

Moreover, as will be readily appreciated, numerous additional benefits are provided by the present invention. In particular, since the protective cover 10 is affixed to the trailer it is available any time and anywhere the trailer is used. In addition, the universal mounting plates 32, 34 obviate the need for any welding or other permanent attachment of fixtures to the trailer. Indeed, the protective cover 10 of the present invention provides similar benefits of indoor dry storage without the exorbitantly high monthly cost.

In connection with the above, the conch-shell like design of the protective cover 10 provides for full coverage for a trailerable item thereby providing protection against the elements of weather. Additionally, the structure of the support frame 12, and in particular the plurality of ribs 14 and flexible cover 16, provides for equally supported sections, thereby preventing the accumulation of ice, water and debris. As the bottom of the protective cover 10 is open to airflow, mold, mildew and the buildup of undesirable smells associated therewith are reduced. While the preferred embodiment shows the protective cover 10 being used to protect a boat, it may also be used in connection with snowmobiles, jet-skies, other personal watercraft, motorcycles, snowmobiles and the like.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A protective cover for trailerable items, comprising:
   a support frame including a plurality of ribs, each of said ribs having opposed first and second leg members and a lateral batten member spanning said first and second leg members and defining an open area thereunder, each of said first leg members and each of said second leg members being rotatable about a common axis;
   a flexible cover supported on said support frame; and
   a pair of mounting mechanisms fixedly attached to opposing sides of a trailer, said mounting mechanisms each including a top mounting plate, a bottom mounting plate and a fastening rod;
   wherein said first and second leg members further include flattened portions at the distal ends thereof and have an aperture provided therethrough; and
   wherein said first leg members are mounted on said fastening rod of one of said mounting mechanisms and said second leg members are mounted on said fastening rod of the other of said mounting mechanisms.

2. The protective cover for trailerable items of claim 1, wherein:
   said plurality of ribs are selectively movable from a first position in which each of said ribs are adjacent one another, to a second position in which each of said ribs are spaced from one another defining a fanned out configuration.

3. The protective cover for trailerable items of claim 1, wherein:
   said plurality of ribs is five ribs.

4. The protective cover for trailerable items of claim 1, further comprising:
   at least one strap for securing said flexible cover to a trailer.

5. The protective cover for trailerable items of claim 1, wherein:
   said plurality of ribs are substantially U-shaped.

6. The protective cover for trailerable items of claim 1, further comprising:
   at least one dogging mechanism for securing said plurality of ribs on said fastening rod, said dogging mechanism including a female threaded portion for engaging a complimentary male threaded portion of said fastening rod.

7. The protective cover for trailerable items of claim 6, wherein:
   said dogging mechanism includes an outer retaining washer and at least one of said pair of mounting mechanisms includes an inner retaining washer fixedly attached to said fastening rods; and
   wherein said flattened portions of said leg members are secured intermediate said inner and outer retaining washers.

8. The protective cover for trailerable items of claim 7, wherein:
   said flattened portions of said leg members, said inner retaining washer and said outer retaining washer have a rough or ribbed surface texture.

9. The protective cover for trailerable items of claim 1, wherein:
   said first and second leg members are at least half the length of said trailerable item.

10. The protective cover for trailerable items of claim 1, wherein:
    said flexible cover is operatively attached to each of said plurality of ribs.

11. A protective cover assembly for trailerable items, comprising:
    a plurality of support ribs operatively connected to a trailer;
    a flexible cover attached to said plurality of support ribs; and
    trailering support poles engaging said trailerable item;
    wherein said plurality of support ribs are selectively movable between a first position in which said plurality of ribs are spaced apart and said flexible cover encompasses an entirety of said trailerable item, and a second position in which said plurality of ribs are adjacent one another and extend substantially vertically to allow for loading and unloading of said trailerable item from said trailer while said cover assembly is attached to said trailer; and
    wherein said plurality of support ribs are selectively movable to a third position in which said ribs are adjacent one another, extend at a rearward angle towards a rear of said trailerable item and are supported by said trailering support poles.

12. The protective cover assembly of claim 11, wherein:
    said protective cover assembly is a conch-shape when in said first position.

13. A protective cover assembly for trailerable items, comprising:
    a plurality of support ribs operatively connected to a trailer;
    a flexible cover attached to said plurality of support ribs; and
    first and second fastening rods operatively connected to opposing sides of said trailer, said first and second fastening rods each having an inner retaining washer spaced from a distal end thereof and fixedly attached thereto, and a male threaded engagement portion adjacent said distal end;
    wherein each of said plurality of support ribs include first and second radial leg members and a lateral batten member, said first and second radial leg members being rotatably mounted on said first and said second fastening rods; and
    wherein said plurality of support ribs are selectively movable between a first position in which said plurality of ribs are spaced apart and said flexible cover encompasses an entirety of said trailerable item, and a second position in which said plurality of ribs are adjacent one another and extend substantially vertically to allow for loading and unloading of said trailerable item from said trailer while said cover assembly is attached to said trailer.

14. The protective cover assembly of claim 13, further comprising:
    a dogging mechanism having a female threaded engagement portion for threadedly engaging said male threaded engagement portion of one of said first and second fastening rods, an outer retaining washer and an actuation mechanism for rotating said dogging mechanism to fixedly secure said support ribs in said first or said second position.

15. The protective cover assembly of claim 14, wherein:
    said inner retaining washer and said outer retaining washer have a rough or ribbed surface texture.

* * * * *